(12) United States Patent
Estevez et al.

(10) Patent No.: US 8,249,666 B2
(45) Date of Patent: Aug. 21, 2012

(54) BATTERY-CENTRIC TAMPER RESISTANT CIRCUITRY AND PORTABLE ELECTRONIC DEVICES

(75) Inventors: Leonardo W. Estevez, Rowlett, TX (US); James F. Hollander, Little Rock, AR (US)

(73) Assignee: Texas Instruments Incorporated, Dallas, TX (US)

( * ) Notice: Subject to any disclaimer, the term of this patent is extended or adjusted under 35 U.S.C. 154(b) by 742 days.

(21) Appl. No.: 11/863,311

(22) Filed: Sep. 28, 2007

(65) Prior Publication Data
US 2009/0085737 A1     Apr. 2, 2009

(51) Int. Cl.
*H04B 1/40*     (2006.01)
*H04M 1/02*     (2006.01)
(52) U.S. Cl. .................. 455/572; 455/343.1; 455/550.1
(58) Field of Classification Search ............... 455/550.1, 455/556.1, 572, 573, 574, 343.1
See application file for complete search history.

(56) References Cited

U.S. PATENT DOCUMENTS

| | | | | |
|---|---|---|---|---|
| 5,164,652 | A * | 11/1992 | Johnson et al. | 320/106 |
| 6,381,477 | B1 * | 4/2002 | Johnson et al. | 455/572 |
| 2006/0121951 | A1 * | 6/2006 | Perdomo et al. | 455/572 |
| 2007/0123314 | A1 * | 5/2007 | Ragan | 455/572 |
| 2007/0123316 | A1 * | 5/2007 | Little | 455/573 |

* cited by examiner

*Primary Examiner* — Blane J Jackson
(74) *Attorney, Agent, or Firm* — Ronald O. Neerings; Wade James Brady, III; Frederick J. Telecky, Jr.

(57) ABSTRACT

Tamper-resistant circuitry for use with an electronic device is provided, where the electronic device comprises a plurality of connections for coupling the tamper-resistant circuitry to functional circuitry for performing functionality in connection with the electronic device. The tamper-resistant circuitry comprises an interface for coupling to the plurality of connections and a power source for coupling to at least one connection in the plurality of connections. The tamper-resistant circuitry further comprises circuitry operable to evaluate a measure of an operational parameter related to the power source and in response to a signal at at least one connection in the plurality of connections, to provide an acceptable range for the operational parameter, and to inhibit standard operation of the functional circuitry in response to detecting an anomaly in the functional circuitry by detecting that the measure is outside the acceptable range.

25 Claims, 5 Drawing Sheets

| | USE CASE 1 (E.G., RINGER) | USE CASE 2 (E.G., VIBRATOR) | USE CASE 3 (E.G., DISPLAY) | USE CASE 4 (E.G., CAMERA) | USE CASE 5 (E.G., SPEAKER) | ... | USE CASE $n$ |
|---|---|---|---|---|---|---|---|
| $M_i$ | $M_1$ | $M_2$ | $M_3$ | $M_4$ | $M_5$ | ... | $M_n$ |
| HL | $M_1 + \Delta_1$ | $M_2 + \Delta_2$ | $M_3 + \Delta_3$ | $M_4 + \Delta_4$ | $M_5 + \Delta_5$ | ... | $M_n + \Delta_n$ |
| LL | $M_1 - \Delta_1$ | $M_2 - \Delta_2$ | $M_3 - \Delta_3$ | $M_4 - \Delta_4$ | $M_5 - \Delta_5$ | ... | $M_n - \Delta_n$ |

$16_F$

… (1) …

BATTERY-CENTRIC TAMPER RESISTANT CIRCUITRY AND PORTABLE ELECTRONIC DEVICES

CROSS-REFERENCES TO RELATED APPLICATIONS

This application is related to U.S. Provisional Patent Application 60/786,454, entitled "Tamper-Resistant Cell Phone Ringer Control Circuit, Ringer, Battery and Systems," and filed Mar. 28, 2006, and U.S. patent application Ser. No. 11/691,879, entitled "Tamper-Resistant Circuitry and Portable Electronic Devices, and filed Mar. 27, 2007, both of which applications are hereby incorporated herein by reference.

STATEMENT REGARDING FEDERALLY SPONSORED RESEARCH OR DEVELOPMENT

Not Applicable.

BACKGROUND OF THE INVENTION

The present embodiments relate to portable electronic devices and are more particularly directed to making such devices less susceptible to tampering.

Portable electronic devices have impacted if not revolutionized many aspects of contemporary lifestyle. One significant example of such a portable device is the cellular telephone. With its advent, improvement, and ubiquitous dissemination, the cellular telephone has changed how people and entities communicate in all manners of business and life. Numerous other portable electronic devices are also widely used and provide various benefits. Such devices include, but are not limited to: the personal digital assistant ("PDA") and related data organizers, any of which is sometimes referred to as a pocket computer or palmtop computer; portable alarm clocks and timers; portable music players capable of playing various audio and video formats, with such formats typically being one or more of various signal compression types (e.g., MP3, MPEG4 AAC, AC-3, WMA, RealAudio, and still others); pagers; portable video game players; wireless email devices and other portable electronic devices. Further, some additional devices include the functionality of two or more of any of the preceding devices.

With increased use and prevalence also comes the unfortunate possibility that such portable electronic devices will be used for undesirable, unauthorized, and nefarious purposes. Indeed, with the development of terrorism, so-called improvised explosive devices ("IED"; plural "IEDs") have been reportedly triggered by a portable electronic device. By placing a call to the cellular telephone, the terrorist might intend to exploit a change in signal activity therein due to the call event. As another example, a programmable function, such as a timed event for an alarm clock might be a subject of such exploitation. It would be desirable to provide improvements that would promote tamper-resistance to attempts to misuse portable electronic devices.

BRIEF SUMMARY OF THE INVENTION

In a form of the invention, tamper-resistant circuitry for use with an electronic device is provided, where the electronic device comprises a plurality of connections for coupling the tamper-resistant circuitry to functional circuitry for performing functionality in connection with the electronic device. The tamper-resistant circuitry comprises an interface for coupling to the plurality of connections and a power source for coupling to at least one connection in the plurality of connections. The tamper-resistant circuitry further comprises circuitry operable to evaluate a measure of an operational parameter related to the power source and in response to a signal at at least one connection in the plurality of connections, to provide an acceptable range for the operational parameter, and to inhibit standard operation of the functional circuitry in response to detecting an anomaly in the functional circuitry by detecting that the measure is outside the acceptable range.

Numerous other forms of the invention are also disclosed and claimed.

DETAILED DESCRIPTION OF EMBODIMENTS

Various embodiments are described below in connection with an approach as implemented into a portable electronic device that implements various operational functionality, such as may be included in a device that includes the functionality of a cellular telephone or multimedia device, by ways of example. However, the inventive scope also may be realized in, and provide significant benefit to, other portable devices, including by ways of example the various devices described above in the Background Of The Invention section of this document. Accordingly, it is to be understood that the following description is provided by way of example only and is not intended to limit the inventive scope.

Figure 1:
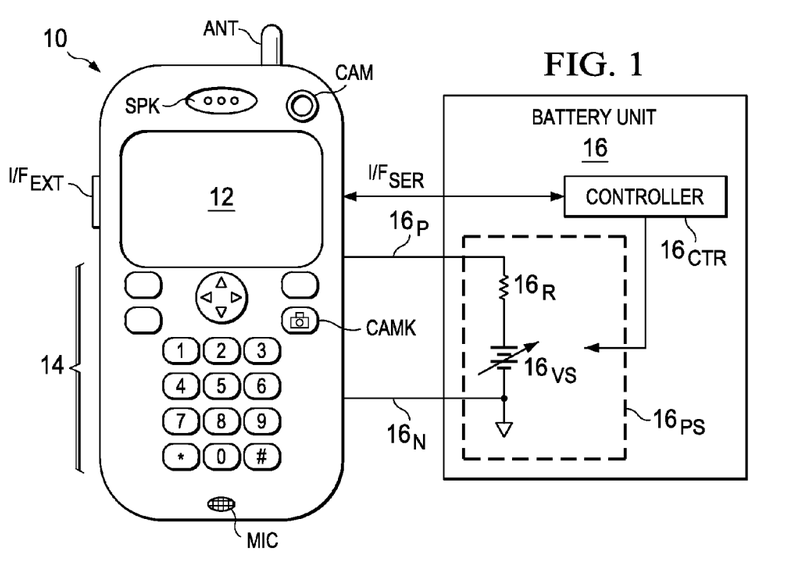
FIG. 1 illustrates a general diagram of a handset according to an embodiment coupled to a battery-centric anti-tamper circuit.

FIG. 1 illustrates a block diagram of a wireless telephone handset 10 coupled to a battery-centric embodiment for making the handset less susceptible to tampering. A battery unit or other power source unit is thus improved in various embodiments for anti-tamper operation. Various aspects of handset 10 are known in the art, and novel aspects are added thereto in some embodiments as well and improve handset 10 for reasons appreciated throughout the remainder of this document.

In the example of FIG. 1, the housing of handset 10 is provided in any of various form factors and provides human interface features, including a microphone MIC, a speaker SPK, and a visual display 12 which may serve solely as an output or which also may include an input functionality such as through a touch screen or write pad functionality, and a keypad 14. Keypad 14 includes alphanumeric and symbol keys for a wireless telephone handset. Soft keys adjacent display 12 suitably provide key functions. A directional key navigates a cursor or the like on display 12. A camera key CAMK actuates a camera function of handset 10, where the lens and image detecting device of camera CAM is on the reverse side of the handset housing. Camera CAM is used for still or video image capture, or both. Handset 10 includes one or more external interfaces I/F$_{EXT}$ that allow for coupling to numerous features of the handset, such as: (i) headphones/earphones; (ii) data transfer and processing including but not limited to data media and modules such as multimedia card ("MMC"), secure digital ("SD"), universal serial bus ("USB"), and serial port module; and (iii) charging battery unit 16. Interface I/F$_{EXT}$ is shown protruding from, but alternatively may be even with or recessed in, the housing of handset 10 in various devices.

Battery unit 16 is suitably constructed as a separate form factor from the remaining form factor and circuitry of handset 10 and may be physically and electrically coupled to the circuitry of handset 10 in various forms. For example, in the reverse side of handset 10, which is not readily visible from the perspective of FIG. 1, the housing of handset 10 may include a void or cavity in which battery unit 16 may be physically connected, with an appropriate mechanism(s) to releasably retain battery unit 16 in that location when desired. Battery unit 16 includes a power source 16$_{PS}$ that includes a voltage source 16$_{VS}$ and an associated battery resistance 16$_R$, where the series connection of voltage source 16$_{VS}$ and battery resistance 16$_R$ are coupled via a positive and negative connection 16$_P$ and 16$_N$, respectively, to circuitry within handset 10. Voltage source 16$_{VS}$ is shown with an arrow across it to indicate that it is, in certain embodiments, variable so that the amount of power/voltage it provides to handset 10 may be intentionally varied, where such variability may be achieved in manners selectable by one skilled in the art, such as with the inclusion of additional circuitry (e.g., pulse width modulation ("PWM")) so as to raise or lower the provided power/voltage when desired, as detailed later hereinbelow. Battery unit 16 includes a controller 16$_{CTR}$ which is bi-directionally connected to circuitry within handset 10, such as by way of a serial interface I/F$_{SER}$. Per some embodiments and as detailed in the remainder of this document, controller 16$_{CTR}$ is operable to render various circuitry within headset 10 more resistant to undesirable tampering after such circuitry and handset 10 are manufactured and may accomplish this by also controlling the variability of voltage source 16$_{VS}$.

Figure 2:
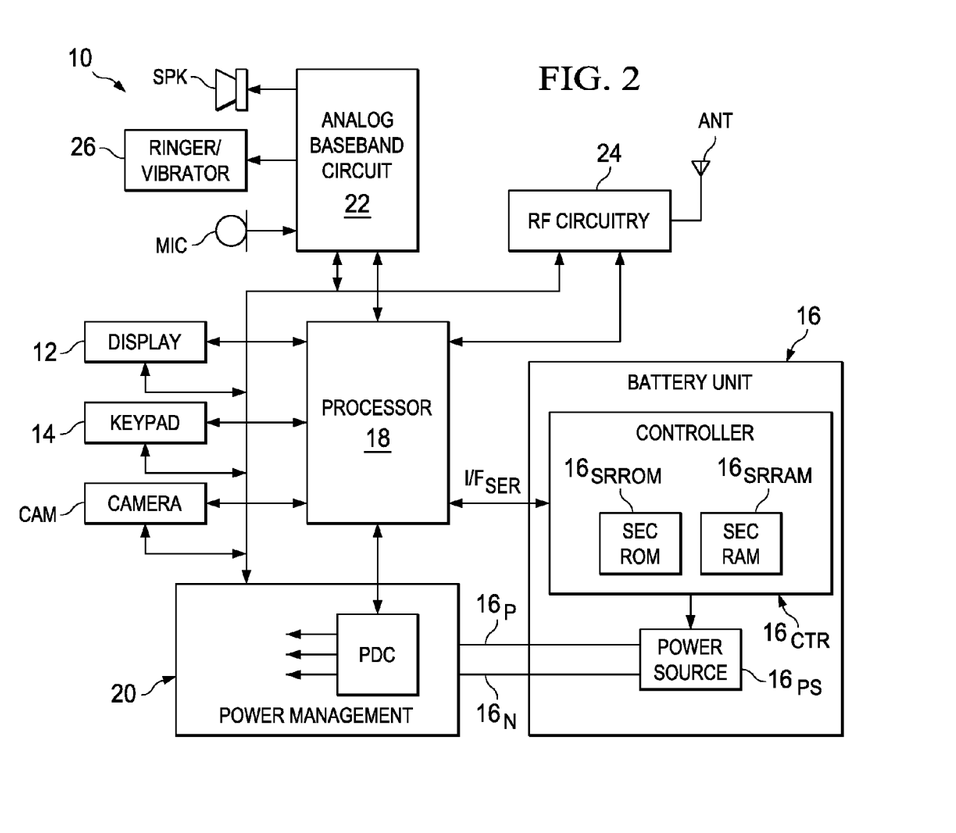
FIG. 2 illustrates an electrical functional block diagram of certain aspects of the handset of FIG. 1 and further detail of a power source-centric anti-tamper circuit.

FIG. 2 illustrates an example of the functional construction of an architecture for handset 10, while the particular architecture of a wireless handset (or other portable electronic device) embodiment may vary from that illustrated in Figure. As shown in FIG. 2, the operational functionality of handset 10 is generally controlled in part by a processor 18, which is coupled to visual display 12, keypad 14, camera CAM, a power management function 20, an analog baseband circuit 22, and radio frequency ("RF") circuitry 24. Each of these items is described below.

A power-source-centric anti-tamper unit 16 of FIG. 2 is analogous to battery unit 16 from FIG. 1, where it is in greater detail shown that within unit 16 is a controller 16$_{CTR}$ that communicates, via serial interface I/F$_{SER}$, with processor 18.

The power source is any type of battery, or solar energy unit, motion-energy-harvesting unit, super-capacitor, other power source or combination thereof. Controller 16$_{CTR}$ operates to evaluate one or more circuit system parameters in view of one or more "use cases" that are occurring at the time of such an evaluation. The phrase "use case" is known in the art and generally refers to the operational status of various subsystems in a device. For example, if at a point a user is operating handset 10 to communicate voice signals, then such operation is considered a use case. As another example, if at a point a user is operating handset 10 to dial a phone number, then such operation is considered another use case. As yet another example, if handset 10 is signaling an alarm (e.g., a calendar event or other timed feature), such as via the display or audibly, then such operation is considered a further use case. Still further, operation of any of the functional blocks (e.g., ringer/vibrator 26, display 12, keypad 14, camera CAM, and the like) may be a use case. Controller 16$_{CTR}$ evaluates a circuit system parameter(s) given the use case(s) occurring at a time with an expectation under normal operations that the evaluated system parameter(s) should be within a respective normal range. If the system parameter(s) is/are out of range, then controller 16$_{CTR}$ has thereby detected an operational anomaly in handset 10, where the anomaly for instance could be indicative of an unauthorized tampering with the circuitry or functionality of handset 10, where such tampering may be the addition of an unauthorized circuit to the as-manufactured circuitry of handset 10 (as opposed to the addition of an authorized accessory). Thus, an unauthorized circuit is an anticipated unauthorized and/or nefarious inclusion of series or parallel-connected circuitry by someone seeking to use handset 10 in an undesirable fashion. It is further anticipated that such an unauthorized circuit is not miniaturized and optimized like circuitry and authorized accessories of a mass-produced cell phone or other mass-produced portable electronic device product, and thus an unauthorized circuit is detectable by controller 16$_{CTR}$ and processes detailed herein. The unauthorized circuit is likely to have wires and other circuitry or the like extending externally from the housing of handset 10. An unauthorized circuit would likely be added after handset 10 has been shipped by its manufacturer. Controller 16$_{CTR}$, by contrast, is preferably part of a removable (e.g., encapsulated) battery unit 16 or otherwise connected within the battery compartment of handset 10 or to electrical nodes to which the battery is connected and is therefore manufactured per specifications to properly operate in connection with handset 10 and per otherwise authorized processes; thus, controller 16$_{CTR}$ may determine whether an anomaly exists in the operation of handset 10 and in response take protective action such as to disable power to handset 10 or in conjunction with a protocol to processor 18 may prevent activation of certain circuits or functionality of handset 10. Accordingly, when such an anomaly is found, controller 16$_{CTR}$ protects the portable electronic device from exploitation that otherwise might be achieved by remotely communicating data that could be voice or sound data as in a telephone call, text data (e.g., text message, e-mail) or control data (e.g., beeper communication) to handset 10, or by programming into handset 10 a timer, timed, or calendar event for an alarm signal or the like. Thus, if the anomaly is attributable to tampering and if such tampering were done with an intent to use handset 10 to cause an undesirable act, for example such as to ultimately operate as an unauthorized trigger for the undesirable act, then by controlling handset 10 the probable occurrence of the undesirable act is either reduced or desirably eliminated. The controller 16$_{CTR}$, to operate as introduced above and detailed later hereinbelow, may include sufficient circuitry, such as a microprocessor by way of example, integrated power monitoring/controlling circuitry, and data storage which, by way of example are shown in FIG. 2 as a secure read only memory ("ROM") $16_{SRROM}$ and a secure random access memory ("RAM") $16_{SRRAM}$.

In an example in FIG. 2 of an electronic device to which unit 16 is coupled, a processor 18 includes a core such as a reduced instruction set computer ("RISC") core and/or a digital signal processor ("DSP"). For simplicity these devices are not separately shown and in some embodiments are suitably included on a single integrated circuit as a combined processor such as a Texas Instruments Incorporated OMAP™ processor. Processor 18 includes a programmable logic circuit, such as a microprocessor or microcontroller, that controls the operation of handset 10 according to a computer program or sequence of executable operations stored in program memory. The program memory is on-chip with processor 18, and alternatively is implemented in read-only memory ("ROM") or other storage in a separate integrated circuit. The computational capability of processor 16 depends on the level of functionality of handset 10, including the generation (2G, 2.5G, 3G, etc.) of wireless services for which handset 10 is to be capable. Internet web browsing, email handling, digital photography, game playing, PDA functionality, and the like are provided and controlled by processor 18. In addition, processor 18, and possibly through its separate DSP component if so included, performs the bulk of the digital signal processing for signals to be transmitted and signals received by handset 10. These functions include digital filtering, coding and decoding, digital modulation, and the like. As introduced above, processor 18, and/or its related DSP, is connected to controller $16_{CTR}$ of battery unit 16, and through a suitable signal exchange such as through a protocol between the two, processor 18 is operable to augment the implementation of a tamper resistant methodology. Contemporary examples of DSPs suitable for use as a DSP in handset 10 according to this embodiment include the TMS320C5x family and TMS320C6x family of digital signal processors available from Texas Instruments Incorporated, and any other DSPs which can support portable electronic device functionality. Controller $16_{CTR}$ in unit 16 is suitably a device from MSP430 family or TMS320C2x family from Texas Instruments Incorporated, and/or any other controller device applicable herein. Controller $16_{CTR}$ in unit 16 is additionally useful for performing impedance tracking operations that monitor the operation, safety, and integrity of the power source $16_{PS}$ internal to unit 16, combined with anti-tamper circuit operations that protect handset 10.

Power management function 20 is coupled to power source $16_{PS}$ of battery unit 16, where power source $16_{PS}$ is one of various types of rechargeable battery power sources and that typically includes a form factor and physical interface consistent with that of handset 10. As introduced earlier from FIG. 1, power source $16_{PS}$ is connected from within unit 16 to handset 10, and as now shown in FIG. 2 to power management function 20, by a separate positive node $16_P$ and negative node $16_N$. At times when power source $16_{PS}$ provides sufficient power to power management function 20, then function 20 distributes regulated power supply voltages to various circuitry within handset 10 and manages functions related to charging and maintenance of power source $16_{PS}$, including standby and power-down modes to conserve battery power. Also in this regard, therefore, FIG. 2 illustrates connections between power management function 20 and many of the components in FIG. 2; these connections are shown by ways of example and are not intended to be exhaustive or limiting. As introduced above and also detailed later hereinbelow, in various embodiments battery unit 16 (more particularly its controller $16_{CTR}$) is operable to detect one or more operational anomalies of handset 10 and, as one response, battery unit 16 reduces or eliminates the power from power source $16_{PS}$ to power management function 20; and in this instance, therefore, function 20 is no longer availed of sufficient power and thus it does not distribute power to the various circuitry within handset 10, thereby preventing or inhibiting the operation of such circuitry which, as introduced above, can likewise prevent or inhibit unauthorized use of such circuitry. Power management function 20 also includes a protective disable circuit PDC that is bi-directionally connected to processor 18. In an alternative embodiment as also later hereinbelow detailed, battery unit 16, upon detection of an operation anomaly as introduced above, notifies processor 18 and in response processor 18 may control protective disable circuit PDC to correspondingly control the operation of selected circuitry within handset 10, where for example therefore protective disable circuit PDC may prevent or impede the operation of such circuitry in response to the detected anomaly. The specific circuitry so controlled by protective disable circuit PDC may vary and by ways of example could include any of the various functional blocks shown in FIG. 2, so to simplify the illustration three arrows in general are shown to the left of protective disable circuit PDC to thereby indicate that it may control any such circuitry but without burdening the Figure by showing connectivity of such arrows to any or each of the various functional blocks.

Analog baseband circuit 22 processes the signals that are received from microphone MIC and communicates them in the digital domain to processor 18 for modulation and transmission. Circuit 22 also processes analog domain signals received from transmissions to handset 10 so that such signals may be output in audible form over speaker SPK after appropriate demodulation. Further, either or both microphone MIC and speaker SPK, and analog baseband circuit 22, may provide functions in addition to telephony, such as in connection with multimedia applications. Such functions may be used for notification, entertainment, gaming, data input/output, PDA functionality, and the like. Typical functions included within analog baseband circuitry 22 include analog-to-digital and digital-to-analog conversion, a voice coder/decoder ("CODEC"), as well as speaker amplifiers and other functions. Analog baseband circuit 22 is also coupled to a ringer/vibrator 26 that emits an audible sound via this ringer functionality or provides a vibration via a vibrator functionality, in response to one or more events. In some embodiments, ringer/vibrator 26 shares space with battery unit 16 in a detachable common unit that provides a housing or encapsulation, and a ringer control circuit is located in the cell phone to which the common unit attaches. Ringer/vibrator 26 is controlled by a current-controlled or voltage-controlled ringer control circuit, e.g., within analog baseband circuit 22, that operates ringer/vibrator 26 using energy from battery unit 16. Such ringing/vibrating functionality responds to a telephone call received by and external from handset 10. Other events may call into operation ringer/vibrator 26, such as receipt of data or a timed event such as an alarm clock or calendar entry. The choice of ringer, vibrator, or both as well as the triggering events therefor are user selectable. Moreover, while shown separately in FIG. 2, note that the ringing function may be included with speaker SPK and the vibrator function may be included with, or formed together with, battery unit 16.

RF circuitry 24 is coupled to antenna ANT and to processor 18. RF circuitry 24 is also coupled to analog baseband circuit 22. RF circuitry 24 includes suitable functions to transmit and receive the RF signals, from and to handset 10, at the specified frequencies and with respect to a wireless telephone communications network.

Figure 3:
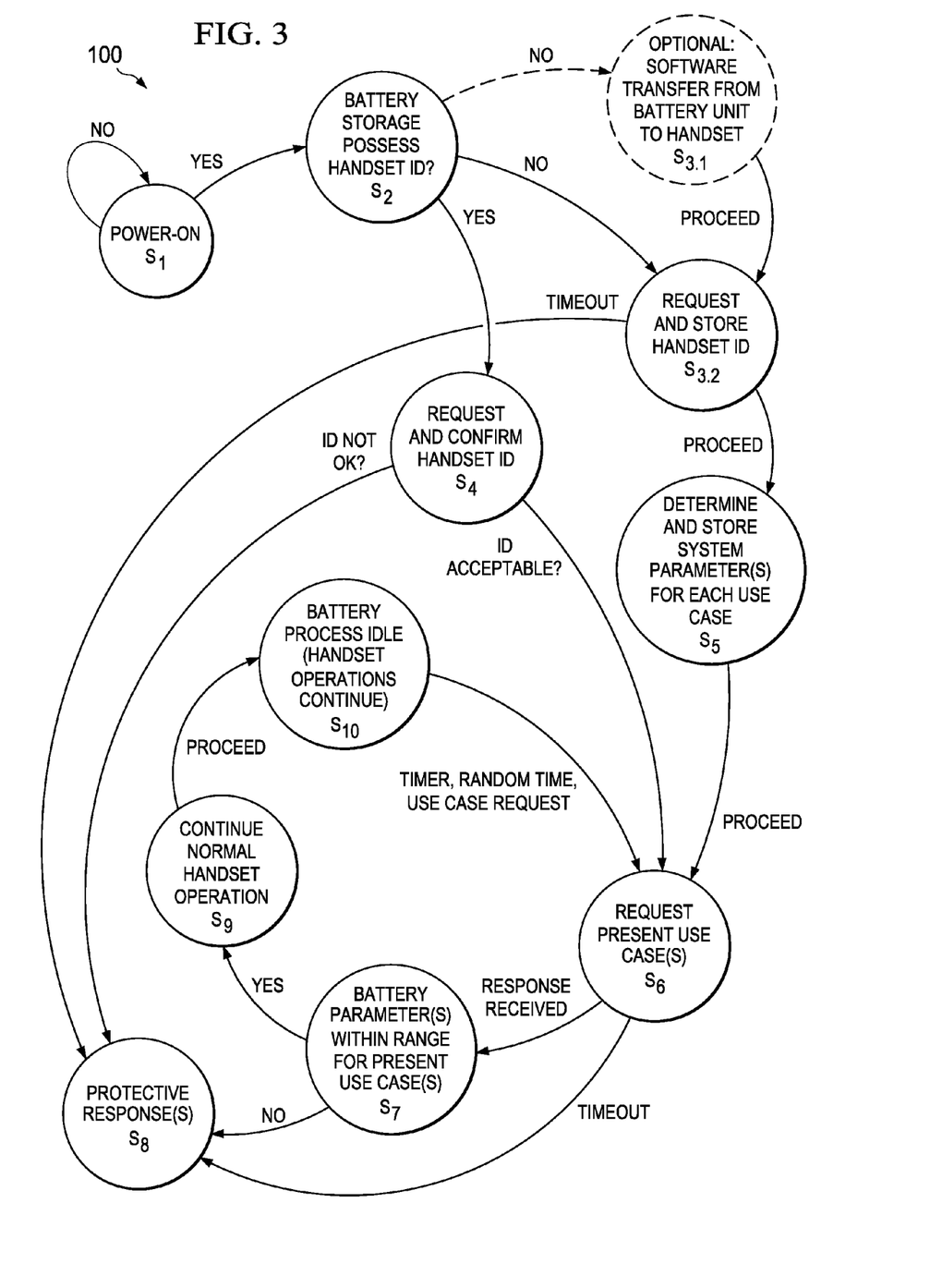
FIG. 3 illustrates a state transition diagram of a methodology to demonstrate operation of a battery-centric anti-tamper circuit in connection with a handset.

FIG. 3 illustrates a state transition diagram of a methodology 100 to demonstrate operation of battery unit 16 according to various embodiments. By way of introduction, note that a state diagram is used by way of example and may be implemented by a corresponding state machine in controller $16_{CTR}$ of battery unit 16 by hardware, software, or a combination thereof. For example, certain software to accomplish the FIG. 3 states and transitions between those states may reside in secure RAM $16_{SRRAM}$ or secure ROM $16_{SRROM}$ and, therefore, be executed by the circuitry or processor of controller $16_{CTR}$. Further, methodology 100 alternatively could be illustrated as a flow chart. While certain steps and the order thereof are shown in various embodiments, certain steps and transitions may be added, removed, or re-arranged in order while still falling within the inventive scope.

Looking now in more detail to methodology 100 in FIG. 3, consider first a state $S_1$, wherein handset 10 is powered-on, which is typically achieved by a user depressing a button or otherwise activating the operational functionality of the handset. Once power-on occurs, then a transition occurs from state $S_1$ to a state $S_2$.

In some embodiments, it is contemplated that battery unit 16 will only provide sufficient operational power to handset 10 if a proper registration is confirmed as between battery unit 16 and handset 10. To satisfy this registration, battery unit 16 requests transmission of a unique identifier of handset 10 from handset 10 to battery unit 16. For instance, the unique identifier is obtained when battery unit 16 is used with handset 10 for a first time such as when handset 10 is still with its manufacturer or when a battery unit 16 is first used by a user, and battery unit 16 confirms that unique identifier for subsequent uses when thereafter connected to the remainder of handset 10 after the first time use. Associated with, or included in, the unique identifier is a product line identification used to help determine whether the battery unit 16 is compatible with handset 10. Toward this end, in state $S_2$, controller $16_{CTR}$ determines whether it stores, for example in its secure RAM $16_{SRRAM}$, an identifier of handset 10. In some embodiments, such an identifier is a unique number that may be associated for example with a subscriber identity module ("SIM") chip in handset 10, or with processor 18 or other circuitry of handset 10, or a combination thereof. If no unique identifier has been stored in handset 10, then a transition occurs from state $S_2$ to a state $S_{3.2}$.

Prior to discussing state $S_{3.2}$, note that in an optional embodiment, and as shown by a dashed line in FIG. 3, a transition following a negative determination in state $S_2$ may occur to a state $S_{3.1}$. In state $S_{3.1}$, software is communicated from battery unit 16 to processor 18 so that such software may thereafter be used by handset 10 to support the anti-tampering communications and functionality described in this document and in relation to battery unit 16. In an alternative embodiment, such software may be pre-loaded or otherwise provided to handset 10 prior to coupling it to a battery unit 16, such as when handset 10 is manufactured and by storing such software in processor 18 or a memory accessible by that processor or by injecting the software into handset 10 from the battery unit 16 itself. If optional state $S_{3.1}$ is implemented, then following the communication of software to handset 10, a state transition occurs from state $S_{3.1}$ to state $S_{3.2}$.

Figure 4A:
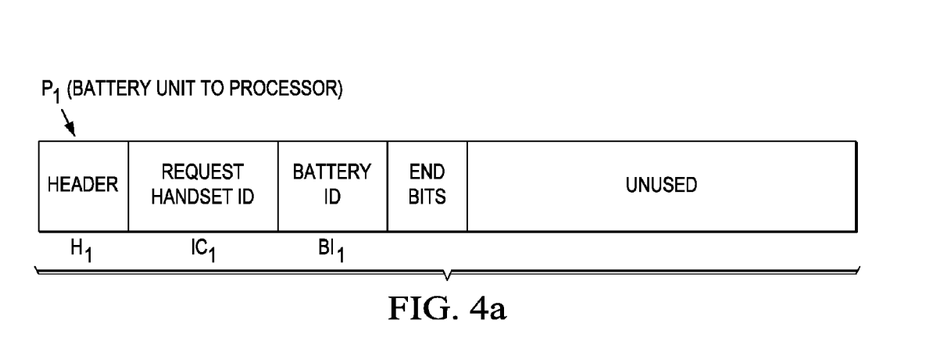
FIG. 4a illustrates an example of a packet $P_1$ for communication from battery unit 16 to handset 10 to request a unique handset identifier.
Figure 4B:
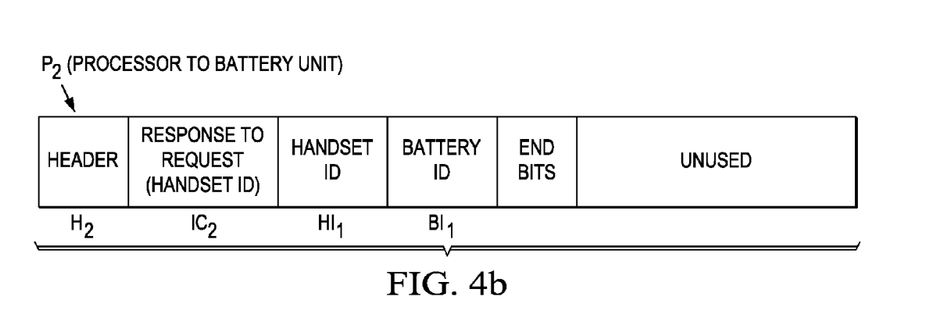
FIG. 4b illustrates an example of a packet $P_2$ for communication from handset 10 to battery unit 16 to provide a unique handset identifier.

Note from the preceding that step $S_{3.2}$ is reached when a battery unit 16 is for the first time used to power up a given handset 10 and that battery unit 16 does not necessarily store a unique identifier of that handset. Also the above-noted product line identifier is suitably stored in the battery unit 16 and compared therein with the product line identifier supplied by handset 10 for a match to determine compatibility between the battery unit 16 and handset 10. In state $S_{3.2}$, battery unit 16 requests from handset 10 its unique identifier. Recall that software is either pre-loaded in handset 10 or communicated to it via preceding state $S_{3.1}$, and therefore such software is able to support a communications protocol for packet information exchange between battery unit 16 and processor 18. In this regard, FIG. 4a illustrates an example of such a packet $P_1$ for communication from battery unit 16 to handset 10. Specifically, in packet $P_1$, following a delimiting header $H_1$ is an instruction code $IC_1$ which upon receipt by processor 18 represents a request for handset 10, if properly configured to do so, to return to battery unit 16 the unique identifier of handset 10, thereby accomplishing the state $S_{3.2}$ request. Packet $P_1$ also optionally includes a battery identifier $BI_1$ that battery unit 16 may communicate to handset 10. Once the state $S_{3.2}$ request is issued (e.g., by packet $P_1$), state $S_{3.2}$ also awaits a response from handset 10, and such a response may be by way of a packet $P_2$ as shown in FIG. 4b. Thus, packet $P_2$ includes a delimiting header $H_2$, followed by an instruction code $IC_2$ which upon receipt by battery unit 16 represents a response to the state $S_{3.2}$ identifier request (i.e., packet $P_1$). Further, following instruction code $IC_2$ is a handset identifier $HI_1$ that is stored by battery unit 16, such as in its secure RAM $16_{SRRAM}$. Further, once state $S_{3.2}$ has requested and received the handset identifier, a transition occurs from state $S_{3.2}$ to a state $S_5$. A timer may be associated with state $S_{3.2}$ whereby if that state does not receive a response from handset 10 within a time period defined by the timer, then a transition occurs from state $S_{3.2}$ to a state $S_8$, where the latter as detailed below implements a protective response, such as prohibiting additional operation(s) of handset 10; thus, battery unit 16 either receives a unique identifier from handset 10 or else a transition occurs from state $S_{3.2}$ to a state $S_8$, meaning handset 10 failed to provide a unique identifier and in response battery unit 16 suitably operates to inhibit certain additional operations of handset 10.

Note from the preceding that step $S_5$ is reached when a battery unit 16 is for the first time used to power up a given handset 10 that battery unit 16 has requested, received, and stored a unique identifier of that handset. Thus, in the first session wherein the given handset 10 has been power up and not yet powered back down, then in state $S_5$, battery unit 16 determines one or more circuit system parameters in view of one or more "use cases" that are being performed by handset 10 during the time of such a determination. State $S_5$ identifies what is expected nominally to be the normal operational system parameters for the investigated use case(s). For example, assume that the system circuit parameter under consideration by battery unit 16 is the impedance as between positive node $16_P$ and negative node $16_N$, and assume also that the use case is a ring operation by ringer/vibrator 26. Thus, during state $S_5$, controller $16_{CTR}$ issues a command to processor 18 whereby the use case of ringer/vibrator 26 is enabled and at the same time the system parameter of impedance is determined by controller $16_{CTR}$. In this regard, impedance may be evaluated by determining the ratio of voltage provided by power source $16_{PS}$ divided by the current provided by that same power source $16_{PS}$, with respect to positive node $16_P$ and negative node $16_N$. Further, this impedance may be determined as a so-called loading perspective, which typically involves the current draw on the battery over a period of time. Once the impedance (or other system parameter) value is measured/determined, controller $16_{CTR}$ stores that value in a table, as further detailed below in connection with FIG. 5, where for instance the table is located in secure RAM $16_{SRRAM}$. As another aspect, note that to effect the state $S_5$ determination, battery unit 16 may gate its voltage/current so that the enabled use case (e.g., ringer/vibrator 26 in preceding example) is not fully energized, but to a level that impedance still may be determined. In this manner, the operation of handset 10 is not disturbed by a seeming random operation of a handset use case. In addition, if handset 10 has already been tampered with, then by attenuating the power provided for the state $S_5$ determination, the reduced power is desirably insufficient to perform as the trigger that is potentially sought by the tampering. State $S_5$ repeats for various different use cases and the respective system parameters corresponding to each such case. Such use cases, may include, operation of any one or more of the blocks shown in FIG. 2, and also may include concurrent operation of one or more of those blocks. Still other uses cases are ascertainable by one skilled in the art. Further, the system parameter evaluated by state S5 may be something other than impedance, such as either current or voltage, alone, provided by batter unit 16. Following the determinations of state $S_5$, a transition occurs to a state $S_6$.

Figure 5:
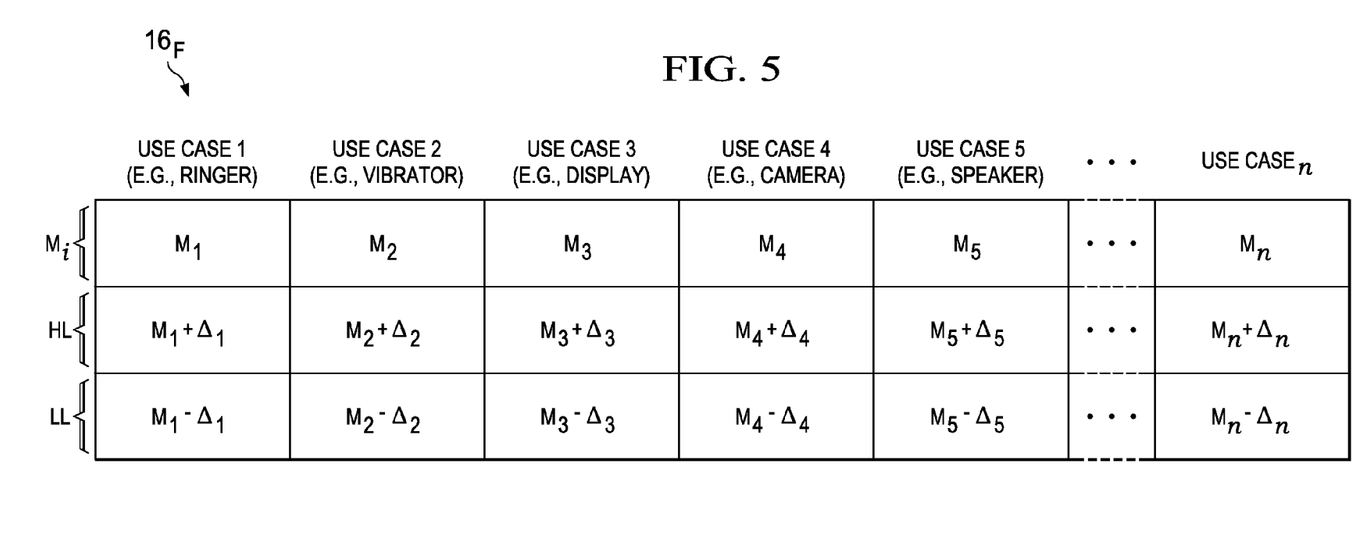
FIG. 5 illustrates a data table $16_F$ for storing measured circuit system parameters corresponding to different use cases.

Before detailing state $S_6$, FIG. 5 illustrates a data table $16_F$ referred to herein as a use case fingerprint table $16_F$ and that is the table into which the above-described measured system parameters from state $S_5$ are stored. Fingerprint table $16_F$ is stored in any storage media accessible by battery unit 16 and protected from tampering, and by way of example the table may be stored in write-once cells of secure ROM $16_{SSROM}$ or in a protected area in secure RAM $16_{SRRAM}$. Turning now to the data in fingerprint table $16_F$ as shown in FIG. 5, and by way of logical illustration but not necessarily as in physical memory addresses, fingerprint table $16_F$ includes a number n of columns. The value $M_t$ at each column in the first row corresponds to the system parameter measurement (e.g., impedance to battery at nodes $16_P$ and $16_N$) for a respective use case, where each use case is correspondingly numbered for reference in FIG. 5 as 1 through n. More specifically, each use case is enabled per state $S_5$, at either full power or reduced (e.g., PWM) power as detailed above, and the measured system parameter is stored in the column for that use case. Thus, the leftmost column corresponds to the example described above with respect to state $S_5$, that is, the ringer functionality of ringer/vibrator 26 is enabled, and the circuit system parameter measured value, $M_1$, is stored in fingerprint table $16_F$ to correspond to that ringer functionality. In the same way, therefore, the next column to the right corresponds to an example where in state $S_5$, the vibrator functionality of ringer/vibrator 26 is enabled, and the circuit system parameter measured value, $M_2$, is stored in fingerprint table $16_F$ to correspond to that vibrator functionality. As another example, the next column to the right corresponds to an example where in state $S_5$, display 12 is enabled, and the circuit system parameter measured value, $M_3$, is stored in fingerprint table $16_F$ to correspond to that display functionality. Still further, note that while FIG. 5 illustrates only one column per use case, in another embodiment a use case may be evaluated more than once but with a different operational attribute whereby the system parameter is then measured and stored given that operational attribute; for example, a use case device (e.g., ringer) may be operated at a first frequency by way of a control from battery unit 16 to processor 18, and the system parameter (e.g., impedance between nodes $16_N$ and $16_P$) may be measured at that frequency and stored in a column of fingerprint table $16_F$. Next, the same use case device (e.g., ringer) may be operated at a second frequency, again by way of a control from battery unit 16 to processor 18, and the system parameter (e.g., again impedance between nodes $16_N$ and $16_P$) may be measured at that second frequency and stored in a different column of fingerprint table $16_F$, thereby corresponding to a different use case due to the different operational frequency. Various other examples including those shown in FIG. 5 will be appreciated or ascertainable by one skilled in the art. Accordingly, in some embodiments the state $S_5$ determination and storage are performed for each use case in fingerprint table $16_F$ and stored in the first row therein. The second and third rows of fingerprint table $16_F$ are described later hereinbelow. As mentioned above, following the completion of state $S_5$, a transition in the operation of battery unit 16 occurs to proceed to a state $S_6$.

Figure 4C:
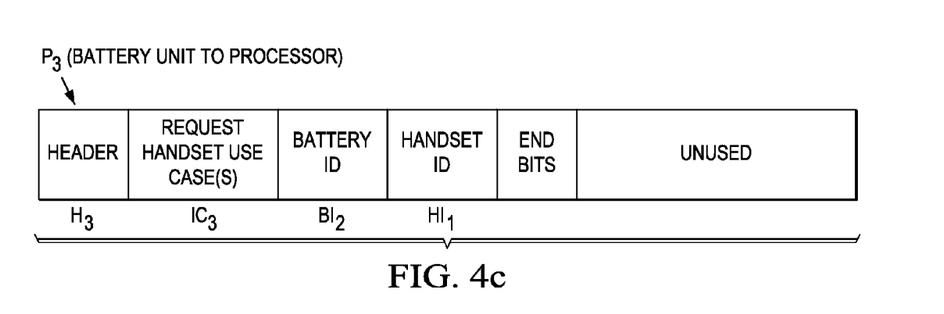
FIG. 4c illustrates an example of a packet $P_3$ for communication from battery unit 16 to handset 10 to request a status report of use cases.

In state $S_6$, battery unit 16 requests from processor 18 an indication of the then-present use case(s) that are in effect by operation of circuitry within handset 10. The request of state $S_6$ also may be achieved by way of the protocol communications between battery unit 16 and processor 18, and in this regard is illustrated in FIG. 4c as such a packet $P_3$. Specifically, in packet $P_3$, following a delimiting header $H_3$ is an instruction code $IC_3$, which upon receipt by processor 18 represents a request for processor 18, if properly programmed to do so, to return to battery unit 16 an indication of present use case(s) then occurring within handset 10. Note that the specific type of use case(s) for which the request is directed may vary based on implementation, and consistent with the present discussion therefore may be any block in FIG. 2 or as depicted in fingerprint table $16_F$ in FIG. 5. Following instruction code $IC_3$ in packet $P_3$ is optionally a battery identifier $BI_2$ in which battery unit 16 re-identifies itself and also included is handset identifier $HI_1$, that was communicated earlier from processor 18 to battery 16; thus, processor 18 may receive and use these identifiers to ensure communication integrity. After the request is issued by battery unit 16 in state $S_6$ and under proper operation, a response from processor 18 should be received in which case there is a transition from state $S_6$ to a state $S_7$. However, a timer also may be associated with state $S_6$ whereby if that state does not receive a response from processor 18 within a time period defined by the timer, then a transition occurs from state $S_6$ to a state $S_8$, where the latter as detailed below implements a protective response.

Figure 4D:
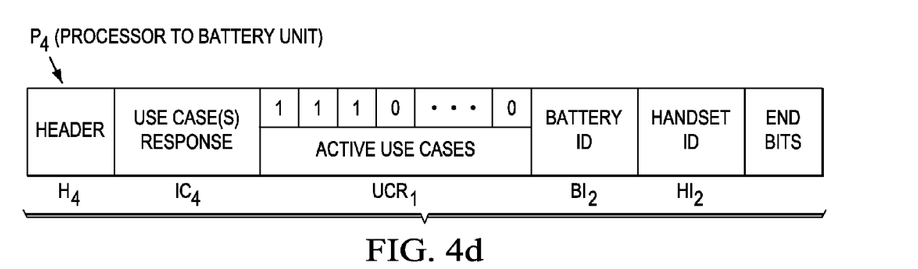
FIG. 4d illustrates an example of a packet $P_4$ for communication from handset 10 to battery unit 16 to report the status of use cases.

From the above one skilled in the art will appreciate that state $S_7$ is reached when a response is provided by processor 18 to battery unit 16 and that indicates the present use case(s) that are then-presently enabled within handset 10. This response of processor 18 and in connection with state $S_7$ also may be achieved by way of the protocol communications between battery unit 16 and processor 18, and in this regard is illustrated in FIG. 4d as such a packet $P_4$. In packet $P_4$, following a delimiting header $H_4$ is an instruction code $IC_4$, which upon receipt by battery unit 16 represents that packet $P_4$ is a response from handset 10 to the state $S_6$ request. Following instruction code $IC_4$ in packet $P_4$ is a use case report field $UCR_1$, wherein the field $UCR_1$ includes a bit for each possible respective use case for which processor 18 may report to battery unit 16; thus, corresponding to fingerprint table $16_F$ in FIG. 5, field $UCR_1$ includes n bits, and by way of example the first bit in field $UCR_1$ may correspond to use case 1 (e.g., ringer), the second bit in field $UCR_1$ may correspond to use case 2 (e.g., vibrator), the third bit in field $UCR_1$ may correspond to use case 3 (e.g., display), and so forth to the $n^{th}$ bit and its respective $n^{th}$ use case. Further, the state of each bit indicates whether its corresponding use case is presently enabled—for sake of example, assume that a high state (i.e., bit equals one) indicates the use case is enabled while a low state (i.e., bit equals zero) indicates the use case is not enabled. Thus, in the illustration of FIG. 4d, use case 1, use case 2, and use case 3 are enabled, while use case 4 is not enabled, that is, the ringer, vibrator, and display are at the reported time enabled, while the camera is not enabled (and the nth use case is also not enabled).

Continuing with state $S_7$, with the use case report (e.g., $UCR_1$) it receives from processor 18, battery unit 16 determines whether the circuit system parameter(s) for each then-enabled use case is within range. More particularly, recall that fingerprint table 16$_F$ stores an expected value of the system parameter for each corresponding use case when no tampering has occurred with the phone, where each such expected value was determined at the first power-up of handset 10 using battery unit 16. Thus, in state $S_7$, battery unit 16 determines whether the then-present same system parameter(s), for the enabled use case(s) as reported in field $UCR_1$, match or are within an acceptable range of the value stored in fingerprint table 16$_F$. Accordingly, continuing the example illustrated by packet $P_4$ which in its field $UCR_1$ indicates that the ringer, vibrator, and display are all then-enabled, then in state $S_7$ battery unit 16 measures the then-present system parameter of interest (e.g., impedance between nodes 16$_P$ and 16$_N$) and determines whether that parameter is within range given the enablement of those three use cases. In other words, under normal operation and with no unauthorized tampering having been done to handset 10, then state $S_7$ is performed in anticipation that the value of the system parameter(s) measured at that time will be within some acceptable delta $\Delta$ from the nominal system parameter(s) values, for the same respective use case(s), determined and stored in an earlier occurrence of state $S_5$. Conversely, if unauthorized tampering has been done to handset 10, then state $S_7$ is performed in anticipation that the value of the system parameter(s) measured at that time will be outside the acceptable delta from the earlier-determined nominal system parameter(s) values. Some embodiments include various manners of comparing the state $S_7$ system parameter(s) to the state $S_5$ system parameter(s) as detailed below, and still others may be ascertained by one skilled in the art. If the system parameter(s) are within range, then a state transition occurs from state $S_7$ to a state $S_9$, where normal operations of handset 10 continue. However, if the system parameter(s) are outside of an acceptable range, in which case a possible unauthorized tampering of handset 10 has been thereby detected, then a state transition occurs from state $S_7$ to state $S_8$, where one or more protective measures are taken by battery unit 16 as further detailed elsewhere herein.

Another embodiment methodology for the state $S_7$ determination of whether the system parameter(s) for the present use case(s) is within an acceptable range is now described. Specifically, a function $f\{\ \}$ is evaluated for each use case $U_x$ and its respective circuit system parameter measurement $M_x$ to define a high limit HL for an acceptable range and a low limit LL for the acceptable range. In this case, high limit HL is a function of products per the following Equation 1 with an added value of delta (i.e., $\Delta$):

$$HL = f\{M_1U_1, M_2U_2, \ldots, M_iU_i, \ldots M_nU_n\} + \Delta \qquad \text{Equation 1}$$

And, the high limit HL is a also function of products per the following Equation 2 but a subtracted value of delta (i.e., $\delta$):

$$LL = f\{M_1U_1, M_2U_2, \ldots, M_iU_i, \ldots M_nU_n\} - \Delta \qquad \text{Equation 2}$$

Alternatively, and as shown in the last two rows of fingerprint table 16F in FIG. 5, for each measured value Mi, it may have a corresponding high limit HL where a delta is added to $M_i$ and a corresponding low limit LL where the same or a different delta is subtracted from $M_i$, where in any case a range is defined between HL and LL within which an untampered system parameter is expected to fall.

Given the preceding, the function $f\{\ \}$ is the expected value of an untampered handset 10 having a number n of use cases each indexed i. The function $f\{\ \}$ is estimated for the combination of use cases $U_i$ and their corresponding earlier-determined (i.e., state $S_5$) system parameter measurements, such as impedance of each use case $M_i$. For each use case $U_i$ that is activated it is represented in Equations 1 and 2 as a one, while inactive use cases are indicated as a zero; thus, the products for inactive use cases are zeroed in Equations 1 and 2 and, thus, only the active use cases $U_i$ affect the value of the function $f\{\ \}$. Further, each activated use case $U_i$ then provides a product when multiplied times its respective circuit system parameter measurement $M_i$. Also, as introduced above, a range limit offset is provided as a parameter $\Delta$, and it could be a different value for each of HL and LL so that a pair of such parameters $\Delta_1$, $\Delta_2$ are provided. Given the preceding, depending on which use cases $UC_i$ are activated or on in handset 10 (i.e., as reported in response to the request of state $S_6$), then battery unit 16 and more particularly its processor-based controller 16$_{CTR}$ detects any departure of actual system parameter measurement (e.g., impedance to battery unit 16 connections) higher than a computed function high limit HL or lower than a computed function low limit LL value. Such departure indicates possible tampering or malfunction with handset 10, thereby causing a transition to state $S_8$, described later hereinbelow. Note also that the various combinations of Equations 1 and 2 may be determined by access to the acceptable nominal system parameter measurement values $M_i$ earlier stored in fingerprint table 16$_F$; further, each function $f\{\ \}$ may be realized by having an earlier-stored combined value for each different combination of bits $U_1, \ldots U_n$, where then a lookup may be achieved to determine the function value for those ones of bits $U_1, \ldots U_n$ already that are enabled at a given time. For example, if $U_1, \ldots U_n$ equals $1110 \ldots 0$ as shown in FIG. 4d, then that value of $1110 \ldots 0$ could be an address or index into a table that indicates the values of HL and LL corresponding to that value of $1110 \ldots 0$.

Note also that the function $f\{\ \}$ can be a sum, and in more complex embodiments the function $f\{\ \}$ is made somewhat non-linear to simulate actual battery loading and less-than perfect voltage regulation or lack thereof to the peripheral module circuits such as ringer, display, etc. Thus, in embodiments wherein the high limit HL is a sum of products, then Equation 1 is as is shown in the following Equation 1.1:

$$HL = M_1U_1 + M_2U_2 + \ldots + M_iU_i + \ldots + M_nU_n + \Delta \qquad \text{Equation 1.1}$$

In embodiments wherein the low limit LL is a sum of products, then use $$LL = M_1U_1 + M_2U_2 + \ldots + M_iU_i + \ldots + M_nU_n - \Delta \qquad \text{Equation 2.1}$$

As yet another embodiment, the state $S_7$ determination may be performed with the same use case(s) activated (i.e., on), in which case limits HL and LL are pre-stored without using the functions of Equations 1 and 2 (or 1.1 and 2.1). Note that if tampering somehow occurred on the status information of a use case $U_i$ itself, then most likely the actual measured circuit system parameter (e.g., impedance) would depart from the HL or LL, causing a transition to state $S_8$ to protect handset 10. Some embodiments cryptographically protect the status information of each use case $U_i$ and other information passed between the battery and handset 10, and so tampering would also be detected due to a cryptographic authentication violation or other cryptographic violation.

Figure 4E:
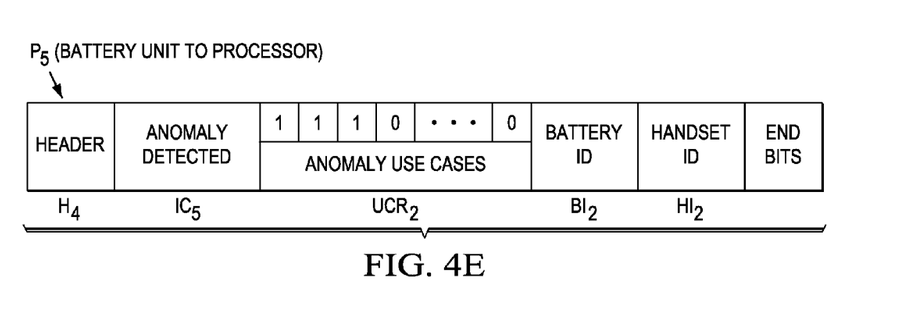
FIG. 4e illustrates an example of a packet $P_5$ for communication from battery unit 16 to handset 10 to report a detected anomaly for a set of report of use cases.

Turning to state $S_8$, recall that it is reached when battery unit 16 has detected an anomaly in the operation of handset 10, where in various embodiments the anomaly is detected in response to a system parameter, or a function of multiple system parameters, either exceeds a limit (e.g., HL) or is below a limit (e.g., LL), where those limits define a range within which normal operation is expected to occur for one or more use cases. In one embodiment, battery unit 16 responds to the detected anomaly by communicating a message packet to processor 18, where the form of such a packet $P_5$ is shown by way of example in FIG. 4e and consistent with the protocol packets already illustrated in FIGS. 4a through 4d. Packet $P_5$ includes an instruction code $IC_5$ that notifies processor 18 that battery unit 16 has detected an anomaly in handset 10, and optionally the packet may include use case report $UCR_2$ which identifies the use case (or combination of use cases) in connection with which the particular anomaly was detected. As in previous packets, packet $P_5$ also may include both the earlier-provided battery identifier $BI_2$ and handset identifier $HI_2$. Processor 18 in different embodiments may operate in various fashions in response to receipt of packet $P_5$. In one embodiment, processor 18 so responds by reporting a problem to the user by way of one or more of its audio-visual mechanisms for communication, such as via its display 12 and its speaker SPK. In another embodiment, either with or without a report to the user, processor 18 also communicates a wireless report of the anomaly by way of a message to a distant transceiver that may communicate with handset 10, such as to a cellular tower from where the message or portions thereof may be communicated onward to an entity or person or may be logged for later access. In another embodiment, processor 18 may communicate with protective disable circuit PDC so that the latter may disable one or more blocks in FIG. 2, such as the block(s) associated with the detected anomalous operation. In addition to or in lieu of the preceding, processor 18 also may respond by entering a random mode, whereby it begins to operate its various functional blocks, such as those shown in FIG. 2, in a random order. Note that this response is by its nature a deterrent to tampering with handset 10, as a would-be nefarious user would be discouraged by the knowledge that tampering with the phone, which presumably is done with an intent to use the phone's predictable behavior, would instead give rise to random behavior. In state $S_8$ battery unit 16 either immediately or after some period of time but in response to detecting the anomaly, discontinues its supply of power to the circuitry of handset 10 that requires such power to operate, thereby shutting down operation of the latter and in some embodiments providing a limited amount of time of operability of handset 10 after the anomaly is detected while maintaining the status quo in each circuit where an anomaly is detected. Thus, if a person has tampered with handset 10, then upon detection of the anomaly/anomalies resulting from such tampering, handset 10 is rendered inoperable and therefore the chance of its use in an unauthorized manner (e.g., to trigger an event) is reduced or eliminated.

In-battery anti-tamper hardware checks, for example, the impedance of handset 10 to check for any departure indicative of physical tampering from earlier first-time measured impedance or current-draw values pre-stored in battery unit 16, and interrogates cell phone authentication software. If a tampering violation (i.e., anomaly) is detected, the battery hardware tells the cell phone not to respond to an alarm clock timeout nor to an incoming call requesting activation of the cell phone ringer, and the controller $16_{CTR}$ cuts off power from the power source $16_{PS}$ itself to handset 10.

Battery-current measurement in power on self test in some embodiments occurs in milliseconds before nefarious ignition can occur. Hardware gates the battery voltage/current (e.g., by pulse width modulation during the self-test in one type of embodiment) so that the circuits are not sufficiently energized to support a nefarious use. And ordinary permitted ring of untampered phone (or other electronic device) is not delayed. Randomized voltage pulsing logic on the battery voltage randomly activates cell phone display, speaker, headphones, and ringer/vibrator for short intervals of time called spurts here (not long enough to create an audible sound or vibration) and discourages attempts to tamper in the first place. As a further tampering deterrent, the cell phone sends a message analogous to E911 to the cellular base station to enter an event-identifying record alerting the operator of phone compromise event (i.e., anomaly) before inactivating the battery in case needed by law enforcement. Cost-effective cell phone anti-tampering measures can not only protect the physical structure of the cell phone from nefarious use, but also can two-way enable and mutually increase expected market for cell phones in all cost tiers and enhance the market for battery fuel gauge technology for semiconductor and battery manufacturers and wireless technology OEMs and increase the market for IEEE 1725-2006 rechargeable battery standards-related technology.

Compromise event detection and countermeasure response involve, for instance, the cell phone (or other electronic device) and battery doing a sequenced procedure after a compromise event is detected. Upon detection of tampering, a first response is that the ringer/display status quo (as it was just before the incoming request) is maintained (usually status quo is Off) and the battery power is maintained. Then a second response, while the battery power is still on, has the cell phone send an E911-like message or maintenance-like message to enter a record of the detected event at the operator. Then a third response turns off the battery power and shuts down the phone.

The detection and direct or indirect controls over the phone (or other electronic device) involve battery-centric architecture herein. In embodiments that use both battery-centric and phone-centric architecture combined and both phone and battery have anti-tampering detection and control circuitry in them that might get into contention or overlapping functions, then a contention-resolving mechanism takes care of whether the control is phone-centric, battery-centric or the controls both co-act to get the best of both together. Such overlapping functions could occur when the same battery is to be used in many different types of cell phones, or when a cell phone has a new generation that adds phone-centric anti-tampering detection and controls and can use and be compatible with batteries used in previous generations.

Anti-tamper and countermeasure functionality for the handset and battery pack are provided by any one, some or all of: 1) loading encrypted/authenticated software into flash memory of the handset at manufacture of the handset, 2) downloading an upgrade of encrypted/authenticated software or software patch into the handset and/or battery pack in a process of operator upgrade maintenance of cell phones/battery packs, and/or 3) loading encrypted/authenticated software into flash memory of the battery pack at manufacture of the battery pack, and then the battery pack injects the authenticated/encrypted cell phone software through the battery management serial link into the cell phone circuitry when the battery pack is inserted into the cell phone, followed by subsequent cell phone execution of the decrypted injected cell phone software when called upon by the battery pack or appropriately and autonomously by the cell phone.

Turning to state $S_9$, the state $S_9$ is reached when no anomalous operation of handset 10 is detected. In this event, normal operations of handset 10 continue as a transition occurs from state $S_9$ to a state $S_{10}$. With respect to the anti-tampering functionality, handset 10 and battery unit 16 continue with normal operations, where in different embodiments any one of three different events cause another transition so as to return to state $S_6$, where these three events include: (1) a timer; (2) a random time period; and (3) a use case request. The first and second events relate to time and therefore may occur independent of the operation of handset 10. Specifically, in event (1), battery unit 16 maintains a timer which, upon reaching a certain time (i.e., timeout) causes a return to state $S_6$, where the above-described methodology from that state onward repeats to determine if an anomaly is then detectable from the then-enabled use case(s). Similarly, in event (2), at the end of a random-length time period as determinable by battery unit 16, a transition occurs to state $S_6$, again repeating the preceding with respect to the then-enabled use case(s). Event (3) involves an additional level of communication as between processor 18 and battery unit 16, whereupon the former may communicate to the latter when a particular use case or cases is either requested or already enabled, at which time a transition occurs to state $S_6$ in order to commence the preceding anomaly-detecting operations with respect to the then-enabled use case(s).

Certain embodiments further contemplate that authorized additions may be made to handset 10 after it is manufactured and such additions are also within the inventive scope. For example, as described earlier, handset 10 includes external (or other electrical) interfaces I/F$_{EXT}$ to which it is intended that various items may be coupled in a vendor approved (i.e., authorized) manner. When an item is connected to such an interface, processor 18 will detect the addition of the item and a verification operation is implemented as between processor 18 and that item, by way of protocol, authentication identifier, through a mechanism provided by a manufacturer of the item, or some other approach as ascertainable by one skilled in the art; to the contrary, if the added-item is not authorized or otherwise vendor approved, then it will fail this authentication analysis provided by processor 18 and an appropriate response to the failed item is taken. In the event the interface-connected item is authenticated, then handset 10 (e.g., by processor 18) communicates the system parameters for any use case with respect to that added item to battery unit 16, akin to the action of state $S_5$ described above but here with the assistance of processor 18 as it has detected the added item. Thus, in a later occurrence of state $S_6$ wherein battery unit 16 requests from processor 18 the present use case(s) of handset 10, should such use case(s) include the item(s) added to external or electrical interfaces I/F$_{EXT}$, then that use case will be evaluated per the previously-communicated system parameters for the item(s) so added, that is, state $S_6$ will determine whether the use of such item is within the range of newly-communicated system parameters in the same manner as it does for other circuitry in handset 10. Accordingly, if there is an out-of-range determination for a system parameter of the added item then a transition occurs to state $S_8$ for a protective response(s) as detailed above.

From the above, it is appreciated that various embodiments provide a portable electronic device that is less susceptible to use after tampering. Various embodiments have been described in connection with cellular telephone handsets, and other embodiments are suitably implemented in these and other portable electronic devices, including but not limited to: the PDA and related data organizers, portable music players, pagers, portable video game players, wireless email devices, and portable alarm clocks, where such items have events that are made to occur so as to change a signal state in the device and that change in signal state is potentially accessible to a nefarious user for triggering a circuit. Still further, while various alternatives have been provided according to the disclosed embodiments, still others are contemplated and yet others can ascertained by one skilled in the art. In various forms the embodiments provide various benefits. For example, various embodiments sense unauthorized tampering by detecting an anomalous circuit system parameter during the enablement or request of enablement of various use cases (e.g., an alarm is to issue, a ringer is to ring, a display is to turn on); in this case, the requested use case is inhibited from occurring and a message may be communicated to the handset user and/or a wireless recipient. If the determination finds no such anomaly, as indicated by measurements within parameter ranges typical of a particular product that is mass-produced, then normal operations of the device are permitted to occur. The use cases that are contingent on the determination just described are myriad in numerous embodiments, and many have been explained above such as an incoming call or e-mail, which in some cell phones and other portable devices, can change the device state by activating the display and the ring/vibrator control circuit or other loads. Still other examples exist and will be appreciated by one skilled in the art. For example, an incoming video and/or audio stream or clip is analogous to an e-mail in certain handsets and other portable devices that thereupon activate the display, a player and other loads such as the ring/vibrator control circuit. As another example, video/audio player devices that play content recorded on a CD or disk drive, the video/audio can control battery current to the display, player/hard drive motor and/or other load (even assuming ringer/vibrator is not activated). Given the preceding, therefore, one skilled in the art should further appreciate that while some embodiments have been described in detail, various substitutions, modifications or alterations can be made to the descriptions set forth above without departing from the inventive scope, as is defined by the following claims.

The invention claimed is:

1. Tamper-resistant circuitry for use with an electronic device, the electronic device comprising a plurality of connections for coupling the tamper-resistant circuitry to functional circuitry for performing functionality in connection with the electronic device, the tamper-resistant circuitry comprising:
   an interface for coupling to the plurality of connections;
   a power source for coupling to at least one connection in the plurality of connections; and
   circuitry operable to evaluate a measure of an operational parameter related to the power source and in response to a signal at at least one connection in the plurality of connections, to provide an acceptable range for the operational parameter, and to inhibit standard operation of the functional circuitry in response to detecting an anomaly in the functional circuitry by detecting that the measure is outside the acceptable range.

2. The tamper-resistant circuitry of claim 1 wherein the anomaly is representative of a change in electrical attributes of the functional circuitry as compared to electrical attributes of the functional circuitry at a time when the electronic device was manufactured.

3. Tamper-resistant circuitry for use with an electronic device, the electronic device comprising a plurality of connections for coupling the tamper-resistant circuitry to functional circuitry for performing functionality in connection with the electronic device, the tamper-resistant circuitry comprising:
   an interface for coupling to the plurality of connections;
   a power source for coupling to at least one connection in the plurality of connections; and circuitry operable to evaluate a measure of an operational parameter related to the power source and in response to a signal at at least one connection in the plurality of connections, to provide an acceptable range for the operational parameter, and to inhibit standard operation of the functional circuitry in response to detecting an anomaly in the functional circuitry by detecting that the measure is outside the acceptable range, wherein the anomaly comprises a change in impedance between two connections in the plurality of connections.

4. Tamper-resistant circuitry for use with an electronic device, the electronic device comprising a plurality of connections for coupling the tamper-resistant circuitry to functional circuitry for performing functionality in connection with the electronic device, the tamper-resistant circuitry comprising:

an interface for coupling to the plurality of connections;
a power source for coupling to at least one connection in the plurality of connections; and
circuitry operable to evaluate a measure of an operational parameter related to the power source and in response to a signal at at least one connection in the plurality of connections, to provide an acceptable range for the operational parameter, and to inhibit standard operation of the functional circuitry in response to detecting an anomaly in the functional circuitry by, detecting that the measure is outside the acceptable range, wherein the circuitry for inhibiting is for terminating provision of power from the power source to the at least one connection in response to detecting an anomaly in the functional circuitry.

5. The tamper-resistant circuitry of claim 1 wherein the interface, the power source, the circuitry to evaluate, provide and inhibit are part of a battery unit for coupling to the electronic device.

6. The tamper-resistant circuitry of claim 5 wherein the battery unit comprises an encapsulated battery unit.

7. The tamper-resistant circuitry of claim 1 wherein the circuitry to evaluate, provide and inhibit includes a memory for storing the evaluated measure and the acceptable range.

8. The tamper-resistant circuitry of claim 1 wherein the circuitry to evaluate, provide and inhibit is operable to request and store a unique identifier from the electronic device.

9. The tamper-resistant circuitry of claim 8 wherein the unique identifier is stored at a first time period, and wherein the circuitry to evaluate, provide and inhibit is operable to inhibit standard operation of the functional circuitry in response to receiving, at a second time period following the first time period, an identifier from the electronic device that differs from the unique identifier.

10. The tamper-resistant circuitry of claim 1 further comprising circuitry for requesting the electronic device to enable the functional circuitry and wherein the circuitry to evaluate, provide and inhibit is operable to determine a measure for the acceptable range while the functional circuitry is enabled.

11. The tamper-resistant circuitry of claim 1 wherein the circuitry to evaluate, provide and inhibit is operable to cause the electronic device to communicate a message in response to the detecting of the anomaly.

12. The tamper-resistant circuitry of claim 11 wherein the message is perceivable by a user of the electronic device.

13. Tamper-resistant circuitry for use with an electronic device, the electronic device comprising a plurality of connections for coupling the tamper-resistant circuitry to functional circuitry for performing functionality in connection with the electronic device, the tamper-resistant circuitry comprising:

an interface for coupling to the plurality of connections;
a power source for coupling to at least one connection in the plurality of connections; and
circuitry operable to evaluate a measure of an operational parameter related to the power source and in response to a signal at at least one connection in the plurality of connections, to provide an acceptable range for the operational parameter, and to inhibit standard operation of the functional circuitry in response to detecting an anomaly in the functional circuitry by detecting that the measure is outside the acceptable range, wherein the circuitry to evaluate, provide and inhibit is operable to determine a value representative of at least one of impedance, current, and voltage at at least one connection in the plurality of connections; and includes a memory for storing the determined value as an acceptable value within the acceptable range.

14. The tamper-resistant circuitry of claim 13 wherein the acceptable range is determined in response to the determined value as adjusted by a delta value.

15. Tamper-resistant circuitry for use with an electronic device, the electronic device comprising a plurality of connections for coupling the tamper-resistant circuitry to functional circuitry for performing functionality in connection with the electronic device, the tamper-resistant circuitry comprising:

an interface for coupling to the plurality of connections;
a power source for coupling to at least one connection in the plurality of connections; and
circuitry operable to evaluate a measure of an operational parameter related to the power source and in response to a signal at at least one connection in the plurality of connections, to provide an acceptable range for the operational parameter, and to inhibit standard operation of the functional circuitry in response to detecting an anomaly in the functional circuitry by detecting that the measure is outside the acceptable range, wherein the acceptable range is determined in response to a plurality of enabled use cases in the electronic device.

16. The tamper-resistant circuitry of claim 15 wherein the circuitry to evaluate, provide and inhibit is operable to request and receive from the electronic device an indication of each of the plurality of enabled use cases.

17. Tamper-resistant circuitry for use with an electronic device, the electronic device comprising a plurality of connections for coupling the tamper-resistant circuitry to functional circuitry for performing functionality in connection with the electronic device, the tamper-resistant circuitry comprising:

an interface for coupling to the plurality of connections;
a power source for coupling to at least one connection in the plurality of connections; and
circuitry operable to evaluate a measure of an operational parameter related to the power source and in response to a signal at at least one connection in the plurality of connections, to provide an acceptable range for the operational parameter, to inhibit standard operation of the functional circuitry in response to detecting an anomaly in the functional circuitry by detecting that the measure is outside the acceptable range; and
circuitry for communicating software to the electronic device.

18. Tamper-resistant circuitry for use with an electronic device, the electronic device comprising a plurality of connections for coupling the tamper-resistant circuitry to functional circuitry for performing functionality in connection with the electronic device, the tamper-resistant circuitry comprising:
an interface for coupling to the plurality of connections;
a power source for coupling to at least one connection in the plurality of connections; and
circuitry operable to evaluate a measure of an operational parameter related to the power source and in response to a signal at at least one connection in the plurality of connections, to provide an acceptable range for the operational inhibit standard operation of the functional circuitry in response to detecting an anomaly in the functional circuitry by detecting that the measure is outside the acceptable range; and
circuitry for requesting the electronic device to enable the functional circuitry and wherein the circuitry to evaluate, provide and inhibit is operable to determine a measure for the acceptable range while the functional circuitry is enabled and is operable to enable the functional circuitry at a power level during the determination of the measure that is lower than a power level of the functional circuitry during normal operations of the electronic device.

19. Tamper-resistant circuitry for use with an electronic device, the electronic device comprising a plurality of connections for coupling the tamper-resistant circuitry to functional circuitry for performing functionality in connection with the electronic device, the tamper-resistant circuitry comprising:
an interface for coupling to the plurality of connections;
a power source for coupling to at least one connection in the plurality of connections; and
circuitry operable to evaluate a measure of an operational parameter related to the power source and in response to a signal at at least one connection in the plurality of connections, to provide an acceptable range for the operational parameter to inhibit standard a operation of the functional circuitry in response to detecting an anomaly in the functional circuitry by detecting that the measure is outside the acceptable range, wherein the circuitry to evaluate, provide and inhibit is operable to cause the electronic device to communicate a message in response to the detecting of the anomaly and wherein the message comprises a wireless message to a device operable to communicate with the electronic device.

20. Tamper-resistant circuitry for use with an electronic device, the electronic device comprising a plurality of connections for coupling the tamper-resistant circuitry to functional circuitry for performing functionality in connection with the electronic device, the tamper-resistant circuitry comprising:
an interface for coupling to the plurality of connections;
a power source for coupling to at least one connection in the plurality of connections; and
circuitry operable to evaluate a measure of an operational parameter related to the power source and in response to a signal at at least one connection in the plurality of connections, to provide an acceptable range for the operational parameter, to inhibit standard operation of the functional circuitry in response to detecting an anomaly in the functional circuitry by detecting that the measure is outside the acceptable range; and
circuitry for causing random operation of the electronic device in response to detecting the anomaly.

21. Tamper-resistant circuitry for use with an electronic device, the electronic device comprising a plurality of connections for coupling the tamper-resistant circuitry to functional circuitry for performing functionality in connection with the electronic device, the tamper-resistant circuitry comprising:
an interface for coupling to the plurality of connections;
a power source for coupling to at least one connection in the plurality of connections; and
circuitry operable to evaluate a measure of an operational parameter related to the power source and in response to a signal at at least one connection in the plurality of connections, to provide an acceptable range for the operational parameter, and to inhibit standard operation of the functional circuitry in response to detecting an anomaly in the functional circuitry by detecting that the measure is outside the acceptable range,
wherein the functional circuitry comprises circuitry for coupling to an interface of the electronic device after manufacture of the electronic device; and
wherein the circuitry operable to inhibit is operable to inhibit standard operation of the circuitry for coupling to an interface in response to detecting an anomaly in the circuitry for coupling to an interface by detecting that the measure is outside the acceptable range.

22. Tamper-resistant circuitry for use with an electronic device, the electronic device comprising a plurality of connections for coupling the tamper-resistant circuitry to functional circuitry for performing functionality in connection with the electronic device, the tamper-resistant circuitry comprising:
an interface for coupling to the plurality of connections;
a power source for coupling to at least one connection in the plurality of connections; and
circuitry operable to evaluate a measure of an operational parameter related to the power source and in response to a signal at at least one connection in the plurality of connections, to provide an acceptable range for the operational parameter, and to inhibit standard operation of the functional circuitry in response to detecting an anomaly in the functional circuitry by detecting that the measure is outside the acceptable range and in response by terminating provision of power from the power source to the at least one connection;
wherein the anomaly is representative of a change in electrical attributes of the functional circuitry as compared to electrical attributes of the functional circuitry at a time when the electronic device was manufactured; and
wherein the interface, the power source, and the circuitry to evaluate, provide and inhibit are part of a battery unit for coupling to the electronic device.

23. A combination of devices, comprising:
an electronic device, comprising:
functional circuitry for performing functionality in connection with the electronic device; and
a plurality of connections; and
tamper-resistant circuitry for use with the electronic device, comprising:
an interface for coupling to the plurality of connections;
a power source for coupling to at least one connection in the plurality of connections and operable to provide power to the functional circuitry; and
circuitry operable to evaluate a measure of an operational parameter related to the power source and in response to a signal at at least one connection in the plurality of connections, to provide an acceptable range for the operational parameter, and to inhibit standard operation of the functional circuitry in response to detecting an anomaly in the functional circuitry by detecting that the measure is outside the acceptable range.

24. The devices of claim 23 wherein the anomaly is representative of a change in electrical attributes of the functional circuitry as compared to electrical attributes of the functional circuitry at a time when the electronic device was manufactured.

25. A method of improving tamper-resistance of an electronic device, the electronic device comprising a plurality of connections for coupling the tamper-resistant circuitry to functional circuitry for performing functionality in connection with the electronic device, the tamper-resistant circuitry comprising:
  coupling a power source to at least one connection in a plurality of connections of the electronic device;
  evaluating a measure of an operational parameter related to the power source and in response to a signal at at least one connection in the plurality of connections; and
  inhibiting standard operation of the functional circuitry in response to detecting an anomaly in the functional circuitry by detecting that the measure is outside an acceptable range for the operational parameter.

* * * * *